United States Patent [19]
Cavanagh et al.

[11] Patent Number: 5,264,905
[45] Date of Patent: Nov. 23, 1993

[54] ELECTRO-OPTIC AUTOMATED TEST EQUIPMENT

[75] Inventors: Paul J. Cavanagh, Northport; Jon M. Hoimes, Stony Brook; Louis A. Luceri, Lindenhurst, all of N.Y.

[73] Assignee: Grumman Aerospace Corporation, Bethpage, N.Y.

[21] Appl. No.: 873,722

[22] Filed: Apr. 27, 1992

[51] Int. Cl.$^5$ .................... G01C 25/00; G01J 1/42
[52] U.S. Cl. ......................... 356/6; 356/153; 356/222; 356/236
[58] Field of Search ............... 356/6, 218, 236, 121, 356/222, 153; 250/228

[56] References Cited

U.S. PATENT DOCUMENTS

| | | | |
|---|---|---|---|
| 4,310,246 | 1/1982 | Blazek | 356/236 |
| 4,530,602 | 7/1985 | Pomphrey | 356/153 |
| 4,600,306 | 7/1986 | Hara et al. | 356/317 |
| 4,694,150 | 9/1987 | Schulz-Hennig et al. | 356/153 |
| 4,785,336 | 11/1988 | McComb et al. | 356/236 |
| 4,842,404 | 6/1989 | Duda | 356/236 |

*Primary Examiner*—Richard A. Rosenberger
*Attorney, Agent, or Firm*—Pollock, Vande Sande & Priddy

[57] ABSTRACT

Primary and secondary mirrors constitute a collimator which permit measurements to be made within a reasonably sized equipment enclosure. An incoming laser beam, from a unit undergoing test, has its light dispersed by an integrating sphere from which radiometric measurements may be made. Further, the output from the sphere passes through an avalanche photo diode for detecting laser beam pulse envelopes. These envelopes may be measured for such parameters as pulse width, and interval. A focal plane array camera is provided to measure boresight deviation from the unit undergoing test.

10 Claims, 3 Drawing Sheets

ELECTRO-OPTIC AUTOMATED TEST EQUIPMENT

FIELD OF THE INVENTION

The present invention relates to automated test equipment, and more particularly to a computerized equipment of this sort for testing electro-optic devices.

BACKGROUND OF THE INVENTION

Electro-optic (EO) technology, which uses the visible through far infrared (IR) portion of the electromagnetic spectrum, has evolved from the basic optical sight to integrated and highly sophisticated weapon systems for fire control, night vision, reconnaissance, and communications for the military. To provide the required test and support, manufacturers have been providing each EO subsystem or unit under test (UUT) with special-purpose automated dedicated test equipment (ATE).

This situation has led to consolidation and standardization of EO test equipment in an effort to curb the rise in development and logistics costs associated with many different dedicated test systems. These requirements have established the goal for generic rather than specialized ATE systems. Attaining this goal is most effectively achieved at the level of support where the EO ATE can achieve further economies by sharing analog, digital, and central processing equipment required to test both EO and non-EO UUTs. Generic EO ATE will require improvements in adaptability to diverse UUTs, optical measurement precision, and test equipment modularity.

In typical setup for testing a laser rangefinder, for example a rangefinder mounted to a tank, a test range of 500 meters is constructed. The rangefinder is mounted to a support on one end of the range, and a target is mounted at the other end. Needless to say, this does not lend itself readily to multiple site field testing.

BRIEF DESCRIPTION OF THE PRESENT INVENTION

The present invention is part of an EO ATE system that can satisfy the testing requirements for as large a class of UUTs as possible while remaining cost-effective, compact, modular, and with the high precision required for optical testing.

Specifically, the present invention has automated test capabilities for laser rangefinders/designators.

The present invention is part of an integrated system based on a modular architecture and a generic implementation of test resources. The modular and bus-structured design permits the enhancement of the test system capabilities to capitalize on the emerging EO technologies. The configuration stresses the importance of modularity to provide easy update and reconfigurability for application to a wide variety of test requirements.

The present invention, a laser tester resource, is a compact, modular asset for laser rangefinder/designator stimulus and response measurement. The present invention measures laser beam parameters such as output energy (power), pulse width, amplitude stability, divergence, self/common boresight, range counter accuracy, first/last pulse logic, and receiver sensitivity. It includes a collimator to focus the laser beam, a radiometer for energy measurement, a focal plane array camera for beam spot capture, a laser diode for delayed returns for range simulation, and the associated electronics and optics. It includes a self-alignment capability using a visual spectrum diode laser to verify the correct positioning of all of the optics.

The mechanical packaging of the present invention is a compact package that does not complicate the optical design.

It includes the required focal planes being in positions that allow easy access to any element that mounts at those focal planes (e.g. camera).

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
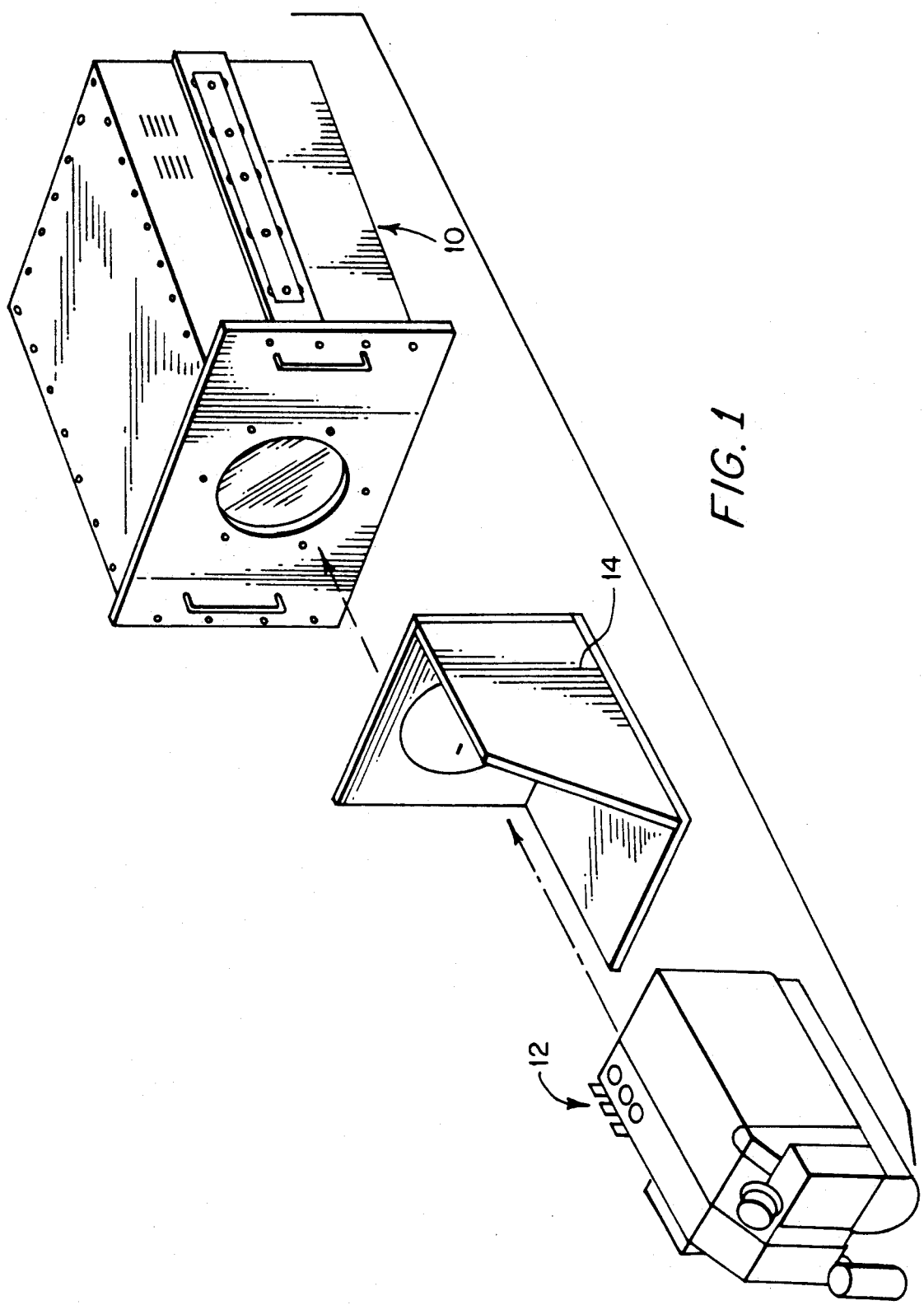
FIG. 1 is a perspective view of the present invention as mounted in a drawer enclosure for testing a typical laser rangefinder. A mounting fixture 14 supports the rangefinder in an optically aligned position.

As seen in FIG. 1, the mounted laser rangefinder 12, mountable in fixture 14, is seen to emit a laser beam into the laser test resource. The test instrument of the invention includes a 90-inch cassegrain collimator 15 specified at f/15 and other components which are contained within the drawer housing 10 shown in FIGS. 2 and 3.

The collimator 15 comprises a primary mirror 16 and a secondary mirror 18, both which may be fabricated of diamond-turned aluminum, which focuses the laser beam. The laser beam is reflected from mirror 18 to a beam splitter 20 so that the laser beam can continue along a first path to a hollow integrating sphere 22 having an internal dispersion surface which disperses the laser beam energy thereby preventing damage of optical components. An inlet port of the integrating sphere accepts the light beam transmitted from the beam splitter 20 and after dispersion, the laser beam exists through two outlet ports. The first outlet port 26 optically communicates with radiometer 24 for measuring the dispersed energy. This tests the energy output of the laser rangefinder 12. A second outlet port from the integrating sphere 22 optically communicates with an avalanche photo diode (APD) 32. This component detects the pulse envelope of the laser beam. The envelope is then parallel connected to pulse width/pulse interval measurement circuits 34 and 36, respectively, both of conventional design. These circuits measure the laser beam pulse parameters to determine whether they are within specification. A third parallel connection from the APD 32 is to a pulse delay generator 38 which generates a delayed trigger signal 40 which is input to the laser 42 which outputs a laser pulse 33 to simulate the range return to the laser rangefinder 12 via the integrating sphere 22 and collimator 15. The rangefinder 12 then measures the received beam for a preselected range measurement corresponding to the pulse delay. The duration of the delay of the range return pulse 40 is programmed by the computer in the automated test equipment system 30 via a standard IEEE 488 databus 37' and path 39. This bus likewise carries the measurement signals from radiometer output 28, the pulse width measurement circuit output 35, and the pulse interval measurement circuit output 37. Electrical I/O signals are bi-directionally connected between the laser rangefinder 12 and the ATE system 30 along lead 41 and similarly, power is established between the ATE system and the laser rangefinder 12 via lead 43. The latter two mentioned connections are conventional for automated testing of electrooptic components such as laser rangefinder 12.

As previously explained, a beam splitter 20 splits an incoming laser beam along two directions. A second direction is along path 44 to mirror 46. Reflections from mirror 46 are directed through a variable filter, in the nature of a filter wheel 48, to a focal plane array (FPA) camera 50. The filters in wheel 48 are laser grade KG glass and are employed to adjust the energy impinging upon FPA camera 50 so as to prevent its damage. Camera 50 is basically a CCD array which detects the xy coordinates of the beam from laser rangefinder 12. This is necessary in order to detect boresight deviation of a laser beam relative to the test equipment. The output of camera 50 provides a scanned image to a conventional frame capture memory 52 which transfers a video signal on line 54, corresponding to the scanned image, to ATE system 30. The output from the frame capture memory 52 is a video signal which is input to the ATE system 30. Laser beam divergence calculations are performed from the frame capture video via software resident in the computer in the ATE system 30.

Figure 2:
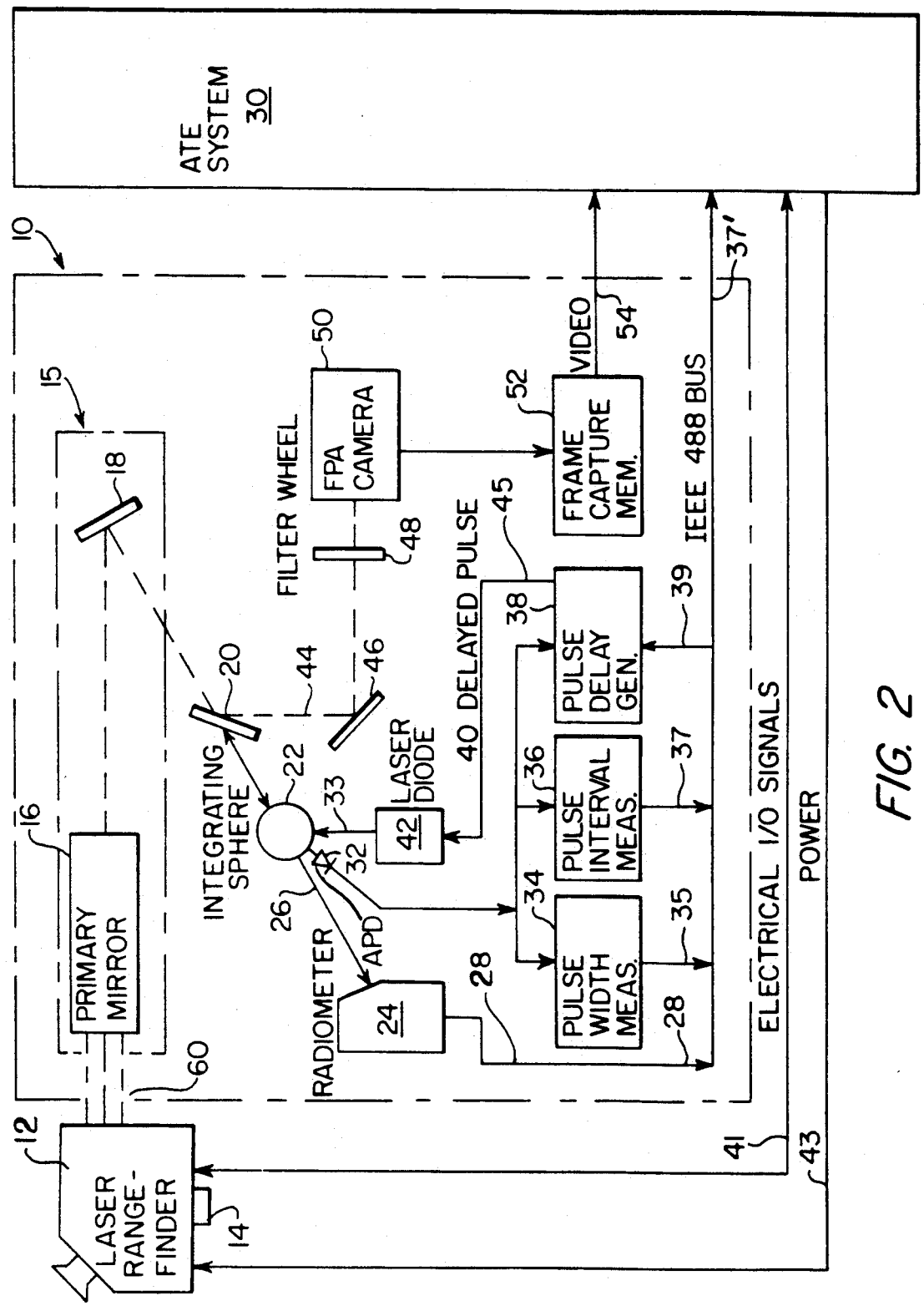
FIG. 2 is a basic block diagram of the present invention.
Figure 3:
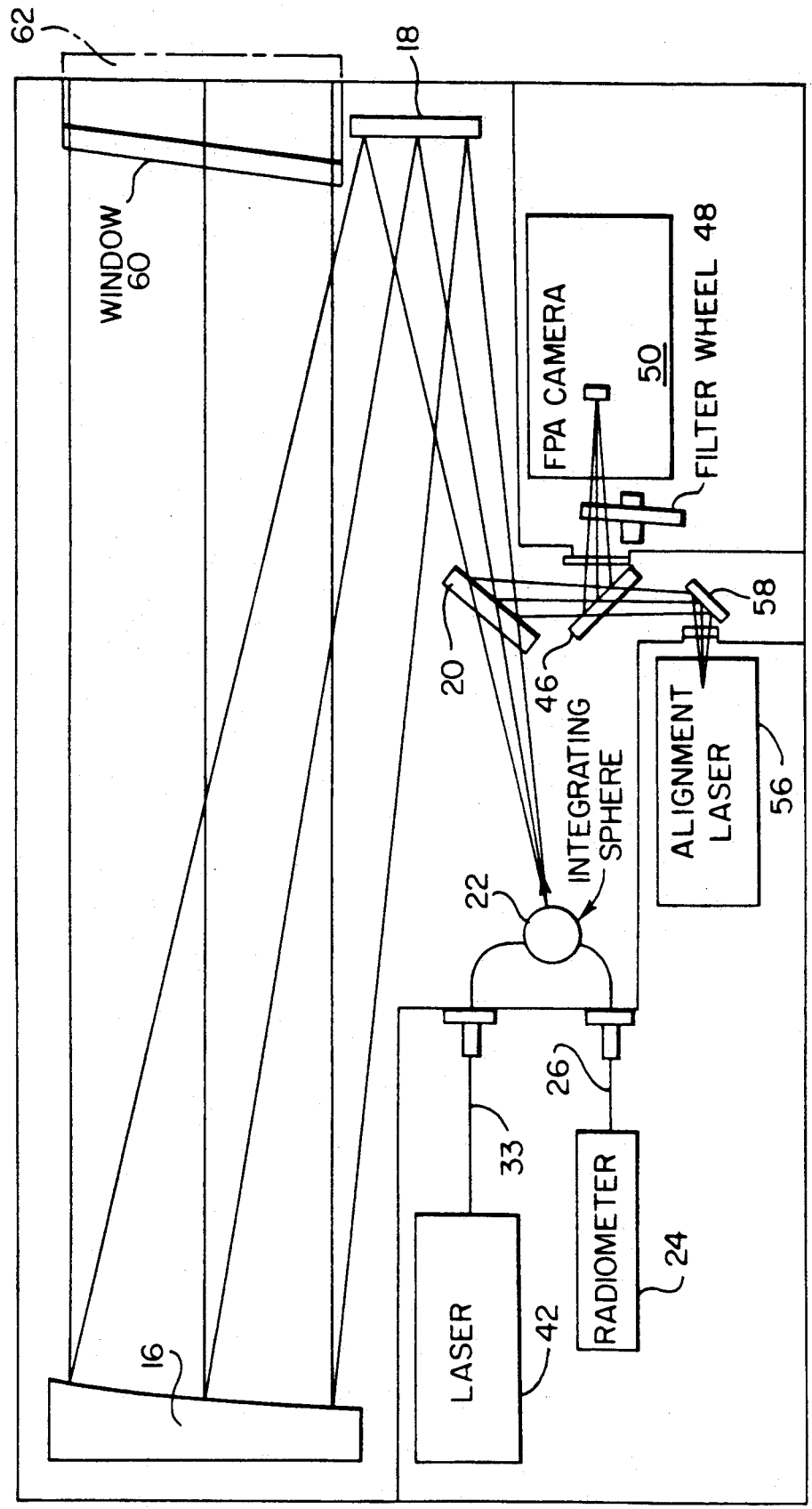
FIG. 3 is a block diagram of an apparatus configured for calculating true boresight.

In order to effectively calculate true boresight it is necessary to measure the x-y offset contributed by non-ideal optical alignment of the various components within the testing apparatus. In order to accomplish this, an alignment laser 56 is employed to generate a laser beam which passes through the various components as shown in FIG. 3. The alignment laser is typically a visible laser diode having an output reflected by mirror 58 to beam splitter 46 which is also shown in FIG. 2. Referring to FIG. 3, the alignment laser beam then passes through splitter 46 to the optical components 20, 18, 16 and is then reflected back from a mirror 62 positioned outwardly of the equipment housing and more particularly outward of an inlet window 60. Use of the alignment mirror 62 allows the alignment beam to double back to beam splitter 46 so that it may be transferred through filter wheel 48 for impingement upon FPA camera 50. The result will be a scanned image of the alignment laser beam which provides an initial offset for any boresight deviation measurements made by the FPA camera 50 when operating in conjunction with a unit under test such as the laser rangefinder 12 (FIG. 2). Accordingly, the present equipment provides for optically calibrating boresight deviation measurements.

From the above discussion it will be appreciated that the above inventions offers a compact electro-optic test apparatus which may be packaged in a single equipment housing drawer quite adaptable for field use. Utilization of the described collimator, comprising primary and secondary mirrors 16 and 18, allow incoming laser beams to be optically processed in a conveniently sized housing as opposed to an extended straight line range.

It should be understood that the invention is not limited to the exact details of construction shown and described herein for obvious modifications will occur to persons skilled in the art.

We claim:

1. A system for testing operating parameters of electro-optic devices, the system comprising:

a window for admitting light from a device;
a folded collimator optically aligned with the window for collimating the admitted light;
means for diffusing the collimated light;
radiometric means receiving the diffused light for measuring corresponding energy levels of the admitted light; and
means in optical alignment with the diffusing means for detecting the envelope of the admitted light.
means connected to the output of the detecting means for measuring preselected characteristics of the admitted light;

2. A system set forth in claim 1 together with means for returning a calibrated, delay light signal to the device, in response to the admitted light, thereby enabling the predetermined measurement of range by the device.

3. The system set forth in claim 1 together with:
means for attenuating the admitted light;
electronic camera means for recording an image of the attenuated light; and
frame capture memory means for storing information corresponding to the image relative to an xy coordinate plane determinative of boresight.

4. The system set forth in claim 1 together with alignment means for emitting a coherent source of light redirected back through a path travelled by admitted light;
the redirected light impinging upon the electronic camera;
the frame capture memory means storing information regarding a redirected light image corresponding to optical offset on the coordinate plane contributed by optic components along the path.

5. A system for testing operating parameters of electro-optic devices, the system comprising:
a window for admitting light from a device;
a folded collimator optically aligned with the window for collimating the admitted light;
means for diffusing the collimated light;
radiometric means receiving the diffused light for measuring corresponding energy levels of the admitted light;
means in optical alignment with the diffusing means for detecting the envelope of the admitted light; and
means connected to the output of the detecting means for measuring preselected characteristics of the admitted light;
means for returning a calibrated, delay light signal to the device, in response to admitted light, thereby enabling the predetermined measurement of range by the device;
means for attenuating the admitted light;
electronic camera means for recording an image of the attenuated light;
frame capture memory means for storing information corresponding to the image relative to an xy coordinate plane determinative of boresight;
alignment means for emitting a coherent source of light redirected back through a path travelled by admitted light;
the redirected light impinging upon the electronic camera; and the frame capture memory means storing information regarding a redirected light image corresponding to optical offset on the coordinate plane contributed optics along the path.

6. The system set forth in claim 5 wherein the diffusing means is a hollowed light integrating sphere.

7. The system set forth in claim 6 and further wherein: the envelope detecting means comprises a photo diode; the camera means comprises a focal plane array device; and the alignment means is an HeNe laser.

8. The system set forth in claim 5 wherein the envelope detecting means comprises a photo diode.

9. The system set forth in claim 5 wherein the camera means comprises a focal plane array device.

10. The system set forth in claim 5 wherein the alignment means is an HeNe laser.

* * * * *